United States Patent
Liu et al.

(10) Patent No.: US 12,549,047 B2
(45) Date of Patent: Feb. 10, 2026

(54) SKIN EFFECT ENHANCED HIGH CONDUCTIVE COMPOSITE STATOR WINDING BUNDLES IN e-MOTORS

(71) Applicant: GM Global Technology Operations LLC, Detroit, MI (US)

(72) Inventors: Yi Liu, Troy, MI (US); Huaxin Li, Rochester Hills, MI (US); John S. Agapiou, Rochester Hills, MI (US); Qigui Wang, Rochester Hills, MI (US); Kestutis A. Sonta, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 18/506,523

(22) Filed: Nov. 10, 2023

(65) Prior Publication Data

US 2025/0158467 A1  May 15, 2025

(51) Int. Cl.
*H02K 3/02* (2006.01)
*H01B 1/02* (2006.01)
(Continued)

(52) U.S. Cl.
CPC .............. *H02K 3/02* (2013.01); *H01B 1/026* (2013.01); *H01B 7/0018* (2013.01); *H01B 7/208* (2013.01);
(Continued)

(58) Field of Classification Search
CPC .......... H02K 1/16; H02K 3/02; H02K 15/105; H02K 15/106; H02K 15/122;
(Continued)

(56) References Cited

U.S. PATENT DOCUMENTS 2,392,388 A * 1/1946 Joyce, Jr. .............. C09D 127/18
338/264
10,749,394 B2  8/2020 Filipenko et al.
(Continued)

FOREIGN PATENT DOCUMENTS

CN  204946585 U * 1/2016 ............... H01B 7/28
CN  113708533 A * 11/2021 ............. H02K 3/345
(Continued)

OTHER PUBLICATIONS

Cao, Mu; Ultrahigh Electrical Conductivity of Graphene Embedded in Metals; Advanced Functional Materials, www.afm-journal.de; 2019; 8 pages; 29, 1806792; Wiley-VCH Verlag Gmbh & Co. KGaA, Weinheim.
(Continued)

*Primary Examiner* — Oluseye Iwarere
*Assistant Examiner* — Daniel K Schlak
(74) *Attorney, Agent, or Firm* — Vivacqua Crane, PLLC

(57) ABSTRACT

A composite wire bundle for a stator winding, a stator including a composite wire bundle, and a method of forming a composite wire bundle. The composite wire bundle includes a plurality of copper wires, wherein each of the plurality of copper wires include a first surface. The composite wire bundle also includes a copper-graphene multilayer composite applied to the first surface of each of the plurality of copper wires, wherein the copper-graphene multilayer composite includes a second surface. Further, the composite wire bundle includes a fluoropolymer matrix formed around the second surfaces and a jacket encapsulating the fluoropolymer matrix.

20 Claims, 4 Drawing Sheets

(51) Int. Cl.

| | |
|---|---|
| *H01B 7/00* | (2006.01) |
| *H01B 7/20* | (2006.01) |
| *H02K 1/16* | (2006.01) |
| *H02K 15/10* | (2025.01) |
| *H02K 15/12* | (2025.01) |
| *H02K 15/122* | (2025.01) |
| *H01R 4/04* | (2006.01) |

(52) U.S. Cl.
CPC ............. *H02K 1/16* (2013.01); *H02K 15/105* (2013.01); *H02K 15/12* (2013.01); *H01R 4/04* (2013.01); *H02K 15/122* (2025.01); *H02K 2203/09* (2013.01); *H02K 2213/03* (2013.01)

(58) Field of Classification Search
CPC ........... H02K 2203/09; H02K 2203/15; H01B 1/026; H01B 7/208; H01B 7/0018; H01F 6/06; H01R 4/04
See application file for complete search history.

(56) References Cited

U.S. PATENT DOCUMENTS

| | | | | |
|---|---|---|---|---|
| 2012/0258311 | A1* | 10/2012 | Hong ..................... | B82Y 30/00 428/688 |
| 2014/0224522 | A1* | 8/2014 | Yamazaki ............. | H01B 3/308 174/110 SR |
| 2018/0102197 | A1* | 4/2018 | Adams ................ | H01B 13/0016 |
| 2018/0182507 | A1 | 6/2018 | Gronowski et al. | |
| 2018/0262074 | A1* | 9/2018 | Duan ................... | H02K 15/105 |
| 2019/0027988 | A1* | 1/2019 | Filipenko ................. | H01B 1/04 |
| 2019/0148037 | A1* | 5/2019 | Leach ..................... | H02K 3/22 174/120 R |
| 2020/0090865 | A1* | 3/2020 | Kim ........................ | H01G 4/12 |
| 2020/0265968 | A1* | 8/2020 | Aizawa ................. | C01B 32/168 |
| 2020/0295427 | A1* | 9/2020 | Bayes ................... | C23C 28/322 |
| 2021/0134483 | A1* | 5/2021 | Kobayashi ............ | H01B 7/0216 |
| 2021/0276874 | A1* | 9/2021 | Chen ........................ | H01B 1/04 |
| 2021/0337666 | A1* | 10/2021 | Goergen .................. | H05K 1/09 |
| 2022/0158519 | A1* | 5/2022 | Kuroyanagi ............ | B60L 50/60 |
| 2022/0199280 | A1* | 6/2022 | Lekarski ................ | H01B 1/026 |
| 2022/0360005 | A1* | 11/2022 | Sapozhnikov ........ | H01R 12/727 |
| 2023/0098820 | A1* | 3/2023 | Tanchon ................ | H02K 55/00 310/52 |
| 2023/0118257 | A1* | 4/2023 | Priebe ................ | H02K 15/0414 310/179 |
| 2025/0196790 | A1* | 6/2025 | Liu ........................ | B60R 16/033 |

FOREIGN PATENT DOCUMENTS

| | | | |
|---|---|---|---|
| CN | 114388167 A | 4/2022 | |
| CN | 117976319 A | 5/2024 | |
| DE | 102016202071 A1 | 8/2017 | |
| DE | 102019220588 A1 * | 7/2021 | ............. H01B 3/301 |
| DE | 102021210974 A1 * | 3/2023 | ............. H02K 15/12 |
| GB | 2351851 A * | 1/2001 | ............. H02K 9/223 |
| JP | 2009199749 A | 9/2009 | |

OTHER PUBLICATIONS

Hidalgo-Manrique et al., Copper/graphene composites: a review, J Mater Sci, Jun. 11, 2019, vol. 54, pp. 12236-12289, Springer, United States.

Kappagantula et al., Macro copper-graphene composites with enhanced electrical conductivity, Journal of Alloys and Compounds, Feb. 15, 2022, vol. 894, 162477, https://www.sciencedirect.com/science/article/abs/pii/S0925838821038871, accessed Nov. 10, 2023, United States.

Pan, Chaochao; Enhanced electrical conductivity in graphene-copper multilayer composite; AIP Advances 12; Oct. 14, 2021; 7 pages; 015310 (2022); AIP Publishing, published online: Jan. 6, 2022; https://doi.org/10.1063/5.0073879.

U.S. Appl. No. 18/337,192, filed Jun. 19, 2023.

Wang et al., Graphene-copper composite with micro-layered grains and ultrahigh strength, Scientific Reports, Feb. 7, 2017, vol. 7, Article 41896, Springer Nature, United States.

Yang et al., Improving the electrical conductivity of copper/graphene composites by reducing the interfacial impurities using spark plasma sintering diffusion bonding, Journal of Materials Research and Technology, Nov.-Dec. 2021, pp. 3005-3015, vol. 15, Science Direct, United States.

Zhu et al., Thermal Conductance of Copper-Graphene Interface: A Molecular Simulation, Materials, Oct. 28, 2022, vol. 15, 7588, Basel, Switzerland.

Liu, Y., et al. U.S. Appl. No. 18/337,192, filed Jun. 19, 2023.

\* cited by examiner

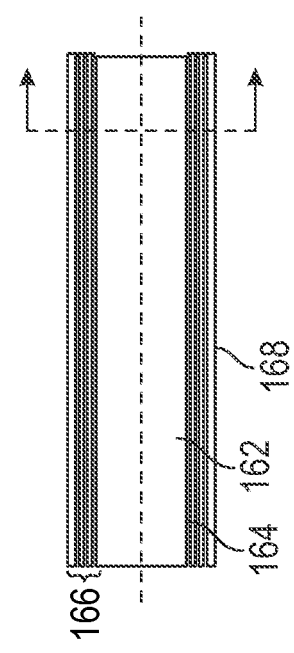
FIG. 3A
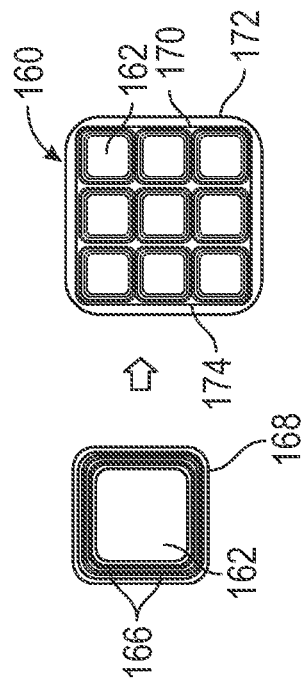
FIG. 3B
FIG. 3C
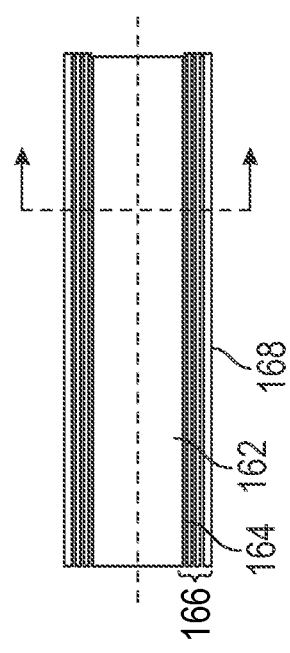
FIG. 4A
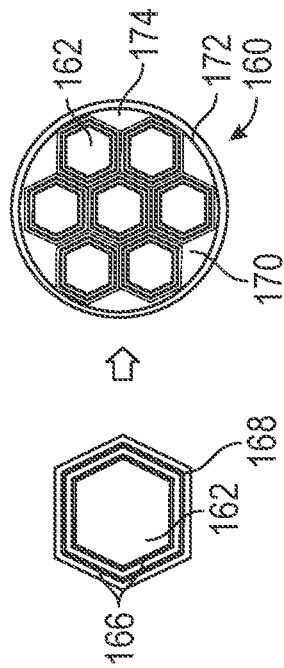
FIG. 4B
FIG. 4C
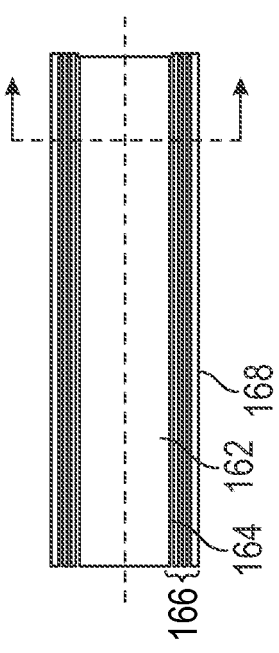
FIG. 5A
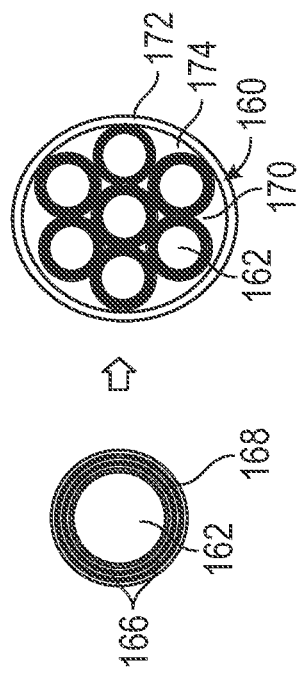
FIG. 5B
FIG. 5C

SKIN EFFECT ENHANCED HIGH CONDUCTIVE COMPOSITE STATOR WINDING BUNDLES IN e-MOTORS

INTRODUCTION

Electric and hybrid electric vehicle technology has been enabled by the development and deployment of rechargeable, secondary batteries which provide energy to electric traction motors, servo motors, and other electronics in the vehicle. The traction motors include a stationary stator and a rotor rotatably positioned within the stator. The stator may include windings of coiled wire wrapped around teeth in the stator. When the stator is energized with an alternating electrical current (AC), the windings create magnetic fields and permanent magnets in the rotor try to align with the magnetic fields causing the rotor to rotate within the stator.

However, in alternating electric current (AC) power distribution, current density tends to be larger near the surface of conductors, such as the windings and busbars of the stator, and decreases approaching the core of the conductors. This effectively decreases the cross-section of the larger conductors and increases effective resistance. This effect, known as the skin effect, increases as the frequency of the alternating current increases. To combat this effect, several smaller conductors often replace a large conductor. Each of the smaller conductors having a smaller cross-sectional area than the large conductor, but together may exhibit a cross-sectional area similar to the large conductor.

Thus, while present conductive wires in traction motor achieve their intended purpose, there is a need for new and improved conductive wire bundles in traction motors.

SUMMARY

According to several aspects, the present disclosure relates to a composite wire bundle for a stator winding. The composite wire bundle includes a plurality of copper wires, wherein each of the plurality of copper wires include a first surface. The composite wire bundle also includes a copper-graphene multilayer composite applied to the first surface of each of the plurality of copper wires, wherein the copper-graphene multilayer composite includes a second surface. Further, the composite wire bundle includes a fluoropolymer matrix formed around the second surfaces and a jacket encapsulating the fluoropolymer matrix.

In embodiments, each of the plurality of copper wires exhibits a diameter in the range of 0.3 millimeters to 10 millimeters.

In any of the above embodiments, copper included in the copper-graphene multilayer composite is oxidized at the second surface. In further embodiments, the oxidized copper in the second surface exhibits a thickness in the range of 5 micrometers to 15 micrometers.

In any of the above embodiments, the copper-graphene multilayer composite exhibits an electrical conductivity in the range of 105% to 400% of the International Annealed Copper Standard (IACS).

In any of the above embodiments, the copper-graphene multilayer composite exhibits a thickness in the range of 10 nanometers to 500 micrometers.

In any of the above embodiments, the copper-graphene multilayer composite includes a plurality of alternating layers of a graphene and copper.

In any of the above embodiments, the copper-graphene multilayer composite includes particles of graphene dispersed between a plurality of coated thin copper layers.

In any of the above embodiments, the fluoropolymer includes polytetrafluoroethylene.

In any of the above embodiments, the jacket includes a polymer. In further embodiments, the polymer includes at least one of the following polymers: polyetherimide (PEI), polyether ether ketone (PEEK), polyimide (PI), polyamide imide (PAI), or an epoxy formed from the polymerization of an epoxide. In yet further embodiments, the jacket includes multiple polymer layers.

In any of the above embodiments, copper is included in the copper-graphene multilayer composite at the second surface is oxidized at the second surface, the wires include copper, the fluoropolymer matrix includes polytetrafluoroethylene, and the jacket includes a polymer.

In any of the above embodiments, the composite wire bundle is wrapped around a plurality of teeth and held in a plurality of channels defined between the plurality of teeth in a stator core. In further embodiments, the composite wire bundle is connected to a busbar. In yet further embodiments, the busbar is connected to an inverter.

According to additional aspects, the present disclosure is directed to a stator including a composite wire bundle for a vehicle. The stator includes a stator core including a plurality of channels defined by a plurality of teeth, and a composite wire bundle, according to any of the above embodiments, received in the plurality of channels. The composite wire bundle includes a plurality of copper wires, wherein each of the plurality of copper wires includes a first surface, a copper-graphene multilayer composite applied to the first surface of each of the plurality of copper wires, wherein the copper-graphene multilayer composite includes a second surface, and copper at the second surface is oxidized, a fluoropolymer matrix formed around the oxidized copper surfaces, and a jacket encapsulating the plurality the fluoropolymer matrix.

According to yet additional aspects, the present disclosure relates to a method of forming composite wire bundles for a stator. The method includes oxidizing copper of a first surface of a copper-graphene multilayer composite formed on a second surface of each of a plurality of copper wires; applying a fluoropolymer on a first surface of a copper-graphene multilayer composite formed on each of a plurality of wires, curing the fluoropolymer, consolidating the plurality of copper wires, forming a fluoropolymer matrix with the applied fluoropolymer, wherein the fluoropolymer matrix surrounds the second surfaces, and forming a jacket around the fluoropolymer matrix.

In embodiments of the above, the method also includes oxidizing copper included in the first surface of the copper-graphene multilayer composite before applying the fluoropolymer.

In any of the above embodiments, the method also includes annealing the copper wires upon curing the fluoropolymer.

BRIEF DESCRIPTION OF DRAWINGS

The drawings described herein are for illustration purposes only and are not intended to limit the scope of the present disclosure in any way.

FIG. 3A illustrates a cross-sectional view along the axis of a composite conductor according to various embodiments of the present disclosure;

FIG. 3B illustrates a cross-sectional view perpendicular to the axis of the copper conductor of FIG. 3A according to various embodiments of the present disclosure;

FIG. 3C illustrates a cross-sectional view perpendicular to the axis of a bundle of copper conductors of FIG. 3A according to various embodiments of the present disclosure;

FIG. 4A illustrates a cross-sectional view along the axis of a composite conductor according to various embodiments of the present disclosure;

FIG. 4B illustrates a cross-sectional view perpendicular to the axis of the copper conductor of FIG. 4A according to various embodiments of the present disclosure;

FIG. 4C illustrates a cross-sectional view perpendicular to the axis of a bundle of copper conductors of FIG. 4A according to various embodiments of the present disclosure;

FIG. 5A illustrates a cross-sectional view along the axis of a composite conductor according to various embodiments of the present disclosure;

FIG. 5B illustrates a cross-sectional view perpendicular to the axis of the copper conductor of FIG. 5A according to various embodiments of the present disclosure;

FIG. 5C illustrates a cross-sectional view perpendicular to the axis of a bundle of copper conductors of FIG. 5A according to various embodiments of the present disclosure;

DETAILED DESCRIPTION

Figure 1:
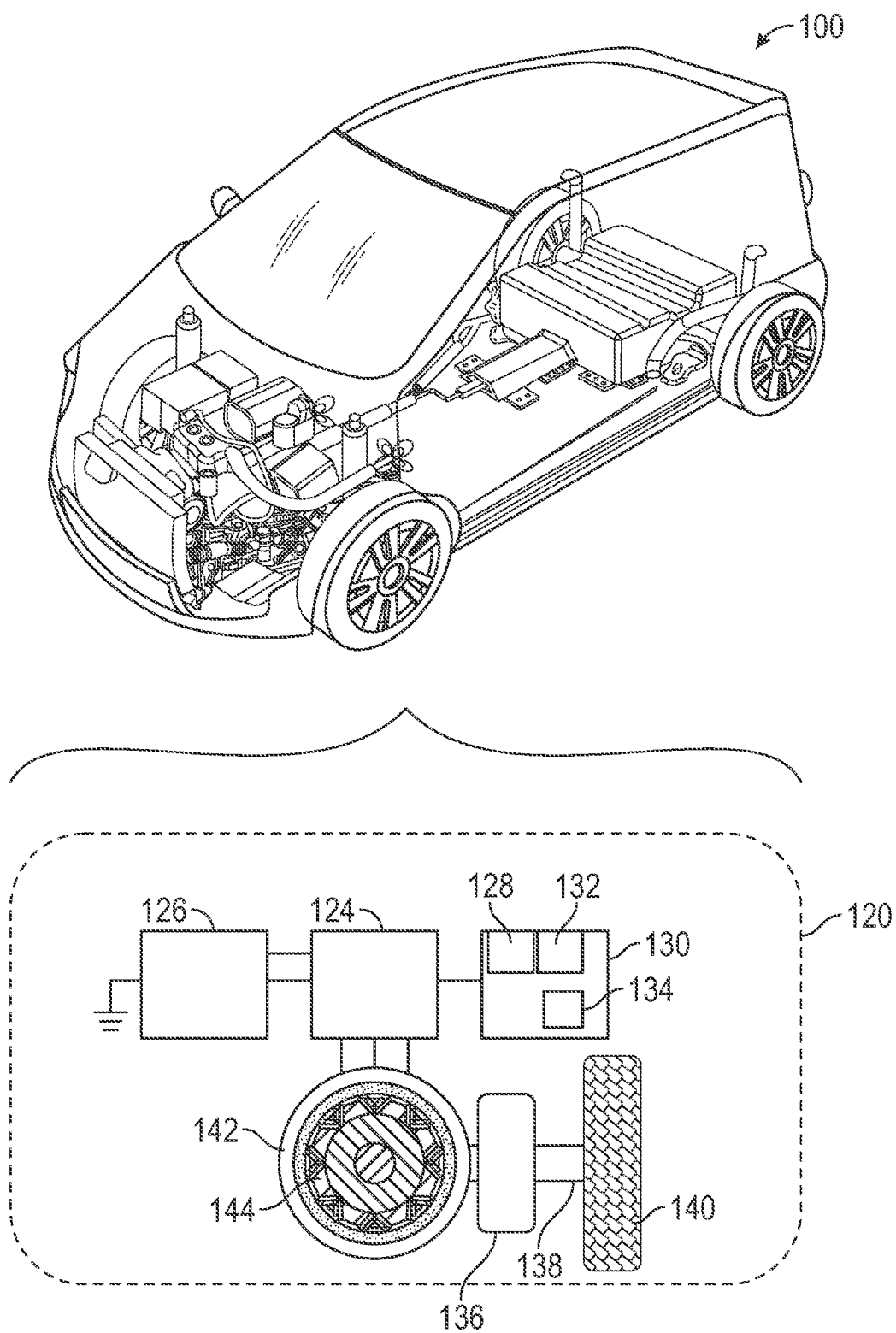
FIG. 1 illustrates a vehicle including a propulsion system utilizing an electric traction motor according to various embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure relates to composite winding bundles for use in a stator, stators including composite winding bundles for use in a vehicle, and methods of forming composite stator winding bundles for use in vehicle.

As used herein, the term "vehicle" is not limited to automobiles. While the present technology is described primarily herein in connection with electric vehicles, the technology is not limited to electric vehicles, but hybrid electric vehicles as well. In addition, the concepts can be used in a wide variety of applications, such as in connection with components used in motorcycles, mopeds, locomotives, aircraft, marine craft, and other vehicles, as well as in other applications utilizing batteries, such as in portable power stations, such as those used for powering remote job sites and emergency back-up power supplies, and permanent power stations associated with buildings and equipment, all of which may be powered by, for example, solar or wind-powered generator systems, power mains, and fuel based power generators such as gasoline or diesel generators as well as sterling engines.

FIG. 1 illustrates a vehicle 100 including a propulsion system 120. The propulsion system 120 generally includes an electric motor 124 and a secondary battery 126 for powering the electric motor 124. Further, in many embodiments of the propulsion system 120, the propulsion system 120 includes an inverter 128 for changing power from DC (direct current) as provided by the battery 126 to AC (alternating current) as it is used by the electric motor 124. The inverter 128 may be included in a power electronics module 130, which includes e.g., transistors and diodes, for switching the power from DC to AC and vice-versa. In embodiments, the battery is connected to the electric motor through the power electronics module.

A controller 132, which may also be included in the power electronics module 130 or otherwise connected to the power electronics module 130, is connected to the inverter 128 and is programmed to control and manage the operations of the electric motor 124 and associated hardware, including the inverter 128. The electric motor 124 is connected to a transmission (drive unit) 136, and drive line 138, which transfers mechanical power and rotation to the wheels 140 of the vehicle 100. The controller 132 includes one or more one or more processors and tangible, non-transitory memory 134.

With reference again to the electric motor 124, the electric motor 124, powered by the battery 126, includes a stator 142 and a rotor 144 arranged in a rotatable manner within the stator 142. The stator 142 is the stationary part of the electric motor 124. When energized with an alternating current (AC), the stator 142 provides a rotating magnetic field with which the stationary magnetic field of the rotor 144 tries to align with, causing the rotor 144 to rotate, in what may be referred to as "motoring" mode. In traction electric vehicle applications, the motoring mode provides propulsion to the vehicle 100. In other applications, the rotor's 144 rotating field (as caused by physical rotation) generates an electric current in the stator 142—this mode of operation is referred to as "generation" and the electric motor 124 used in this way is used as a generator. Generation mode takes some of the energy recovered from braking, e.g., when the vehicle is in the process of slowing and stopping and stores it back in the battery 126.

Figure 2A:
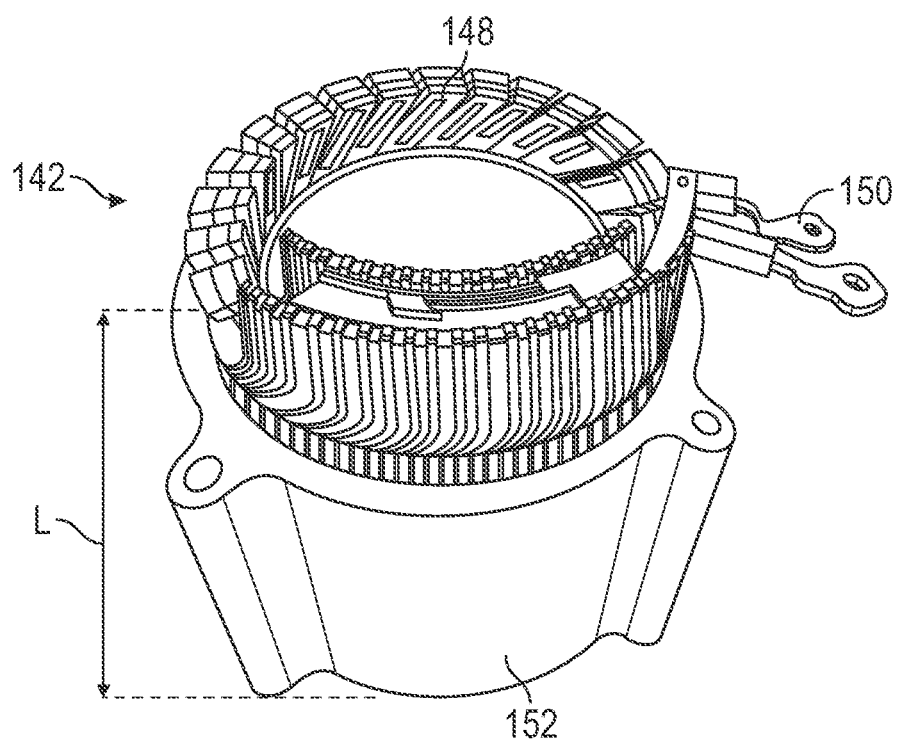
FIG. 2A illustrates a traction motor stator according to various embodiments of the present disclosure.
Figure 2B:
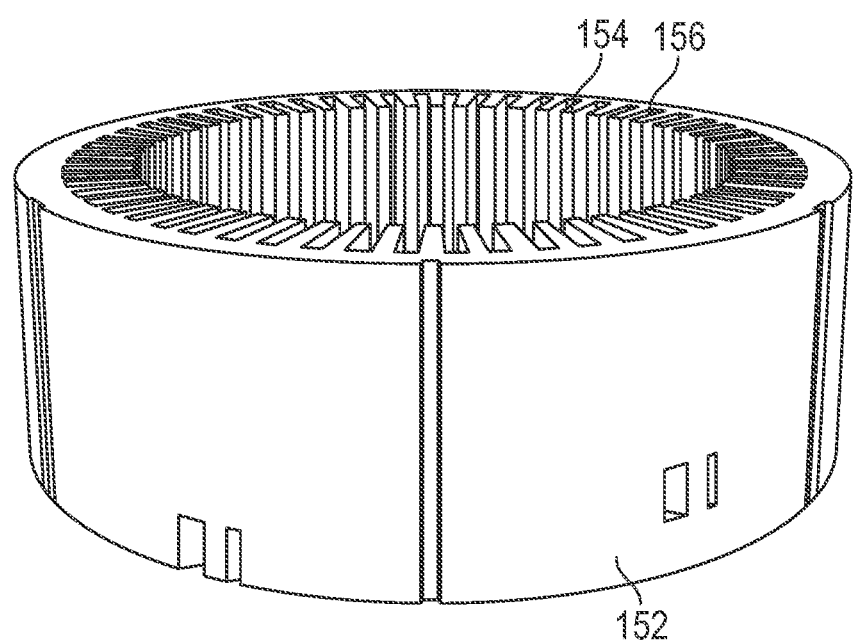
FIG. 2B illustrates a stator core according to various embodiments of the present disclosure.

Reference is made to FIGS. 2A and 2B illustrating an example of stator 142. The stator 142 may generally include a plurality of wire windings 148 extending the length L of the stator 142. The wire windings 148 are connected to one or more busbars 150, which connect the wire windings 148 to inverter 128 in the power electronics module 130 and battery 126. The wire windings 148 are wrapped around a plurality of teeth 154 that project from a core 152 of the stator 142, as illustrated in FIG. 2B. A plurality of channels 156 are defined between the teeth 154 for receiving the wire windings 148. As illustrated, the core 152 assumes the geometry of a cylinder and the teeth 154 project into the opening defined by the stator 142. In alternative embodiments, the teeth 154 may project from the exterior surface of the core 152.

In embodiments, the wire windings 148 are formed from a composite wire bundle 160, such as those illustrated in FIGS. 3A through 5C. The composite wire bundles 160, such as those illustrated in FIGS. 3C, 4C, and 5C, include a plurality of copper wires 162. While reference is made herein to copper wires, alternatively the wires may be any material formed of an electrically conductive material exhibiting a conductivity of at least 1×10^7 Siemens per meter (S/m) at 20 degrees Celsius, such as in the range of 1×10^7 S/m at 20 degrees Celsius to 6.3×10^7 S/m at 20 degrees Celsius. Accordingly, in alternative embodiments, the wires include steel, aluminum, aluminum alloys and copper alloys. The copper wires 162 may each exhibit a thickness, or diameter, in the range of 0.3 millimeters to 10 millimeters, including all values and ranges therein such as 0.5 millimeters to 5 millimeters. Further, as illustrated in FIGS. 3B, 4B, and 5B, the copper wires 162 exhibit any number of cross-sections including square (FIG. 3B), hexagonal (FIG. 4B), and circular (FIG. 5B), as illustrated, as well as rectangular, oval, elliptical, pentagonal, etc. Further, the wires may include foils or traces deposited on a substrate. The foils may contain copper-graphene multilayer coated on their surface and are later wrapped around the copper bars or wires. It should be appreciated that the wires referenced herein may be replaced by other conductors that may be used to conduct electricity in the vehicle.

Each of the copper wires 162 include a surface 164, as illustrated in FIGS. 3A, 3B, 4A, 4B, 5A, 5B, with a copper-graphene multilayer composite 166 formed on the surface 164 of each of the copper wires 162. In embodiments, the copper-graphene multilayer composite 166 exhibits an electrical conductivity in the range of 105% to 400% of the International Annealed Copper Standard (IACS), including all values and ranges therein. The International Annealed Copper Standard (IACS) is understood as the percentage of conductivity a material has relative to copper, which is considered 100 percent conductive and references a copper having a resistivity of 1.7241 microohm-centimeters at 20 degrees Celsius. In embodiments, the copper-graphene multilayer composite 166 includes one or more alternating layers of copper and graphene deposited on the copper wires 162. In such embodiments, graphene is first deposited on each copper wire 162 and then copper is deposited over the graphene, and the process is repeated until the desired number of layers are present. In additional or alternative embodiments, graphene particles are dispersed between a plurality of coated copper layers. In yet further embodiments of the above, the copper and graphene may be deposited, either as alternating layers of the copper and graphene or with graphene particles in a copper matrix, onto a copper foil that may then be wrapped around the copper wires 162. The copper-graphene multilayer composite of any of the above embodiments, may be applied directly to a copper wire 162 or to a copper foil, which is wrapped on a copper wire 162, using one of several techniques such as electrochemical deposition, electrodeposition, physical vapor deposition, chemical vapor deposition, and layer by layer assembly. The copper-graphene multilayer composites 166 may exhibit a thickness in the range of 10 nanometers to 500 micrometers, including all values and ranges therein such as in the range of 30 micrometers to 300 micrometers. When foil is present, the foil exhibits a thickness in the range of 5 micrometers to 25 micrometers, including all values and ranges therein, in addition to the remaining copper-graphene multilayer composite.

In addition, in any of the above embodiments, copper at the surface 168 of the copper-graphene multilayer composite 166 is oxidized forming copper oxide including a mixture of cuprous oxide (CuO) and cupric oxide ($Cu_2O$). The copper oxide is an electric insulator, providing an insulative layer surrounding the individual copper wires 162. An electrical insulator, as understood herein, is a material that exhibits an electrical conductivity of less than 1.0×10^3 Siemens per meter at 20 degrees Celsius. The oxidized copper at the surface 168 may exhibit a thickness in the range of 5 nanometers to 15 micrometers, including all values and ranges therein, including all values and ranges therein such as 10 micrometers.

A fluoropolymer matrix 170, as illustrated in FIGS. 3C, 4C, and 5C, is formed on the surfaces of the oxidized copper surface 168 of the copper-graphene multilayer composite 166. The fluoropolymer matrix 170 may initially be applied as a fluoropolymer coating on each wire 162. In embodiments, the fluoropolymer coating exhibits a thickness in the range of 0.1 micrometer to 500 micrometers, including all values and ranges therein. The copper wires 162 are then bundled together and the fluoropolymer coating on each copper wire 162 is heated and consolidated to form a fluoropolymer matrix 170 as described further herein. In embodiments, the fluoropolymer includes polytetrafluoroethylene (PTFE) or a polyfluoroalkoxy alkane (PFA), for example, exhibits a tensile strength of 21 megapascals (MPa) to 34 MPa, and elongation of 300 to 500 percent, and a folding endurance of over a million cycles, allowing for relatively easy deformation of the wire bundle 174.

One or more layers of a jacket 172 is provided over the fluoropolymer matrix 170 of the bundled copper wires 162 to form the composite wire bundle 160. In embodiments, the jacket 172 includes a polymer. Suitable polymers include, for example, polyetherimide (PEI), polyether ether ketone (PEEK), polyimide (PI), polyamide imide (PAI), or an epoxy formed from the polymerization of an epoxide. Where multiple layers of the jacket 172 is present, each layer may be formed from the same or a different material.

Figure 6:
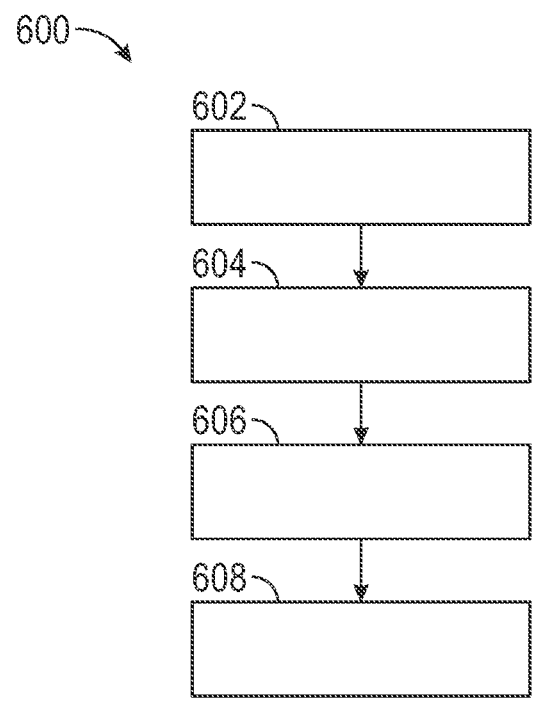
FIG. 6 illustrates a method of forming a conductive tape according to various embodiments of the present disclosure.
Figure 7:
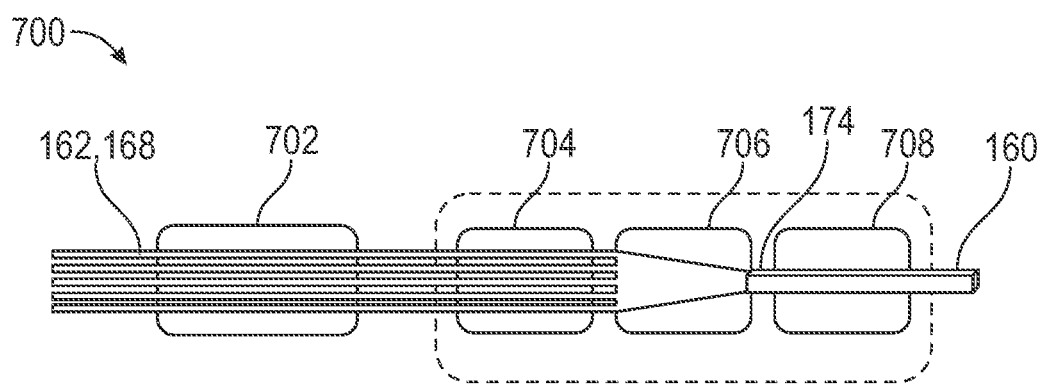
FIG. 7 illustrates a schematic of a bundling process according to various embodiments of the present disclosure.

In various embodiments, the composite wire bundle 160 is formed using methods 600 and systems 700 such as those described in FIGS. 6 and 7. At block 602, the surfaces 168 of the copper-graphite multilayer composite 166 are oxidized. Oxidation occurs in a heated environment 702, such as a furnace, which is heated at a temperature in the range of 425 degrees Celsius to 475 degrees Celsius, including all values and ranges therein, such as 445 degrees Celsius to 455 degrees Celsius. The heating environment 702 includes oxygen. In embodiments, the heating environment 702 includes air. Heating of the surfaces 168 of the copper-graphite multilayer composite 166 may occur for a first time period in the range of 1 hours to 10 hours, including all values and ranges therein, such as from 300 minutes to 420 minutes.

Once the surfaces 168 of the copper-graphite multilayer composite 166 are oxidized, one of the above referenced fluoropolymers is applied as a coating on the oxidized surfaces 168 at block 604. In embodiments, the outer surface oxidized copper-graphite multilayer composite 166 coated copper wires 162 is cooled to a second temperature below the melting temperature of the fluoropolymer that will be sprayed on the oxidized surface, such as in the range of 20 degrees Celsius to 250 degrees Celsius, including all values and ranges therein, such as from 20 degrees Celsius to 200 degrees Celsius. Melting temperature is understood herein as the temperature, at a given pressure, that a polymer material (such as the fluoropolymer) begins to melt and become viscous due to increases in atomic motion on the sub molecular and molecular level. The fluoropolymer is applied using one of the following processes 704 including spraying, air atomized spraying, dip spin coating, or electrostatic coating with a sprayer. In such processes, the fluoropolymer may be dispersed in a solvent, such as trichlorotrifluoroethane, or other halogenated hydrocarbon exhibiting a boiling point of less than 60 degrees Celsius at standard pressure (20 degrees Celsius). Alternatively, the fluoropolymer is applied in a fluidized bed in which the oxidized copper-graphite multilayer composite 166 coated copper wires 162 may be heated at a first temperature that is at or greater than the temperature of the fluoropolymer while in the furnace 702 and transferred into a fluidized bed containing powdered fluoropolymer that is agitated with air or another gas. The fluoropolymer powder adheres to the oxidized surfaces 168 of the preheated wires 162 as the wires 162 are passed through the fluidized bed. In embodiments, the fluoropolymer coating is applied relatively evenly, by mass, over the oxidized surfaces 168.

At block 606, the copper wires 162, including the fluoropolymer coating, are formed into a bundle 174 by curing the fluoropolymer coating and consolidating the copper wires 162 together. To consolidate the copper wires 162, the copper wires 162 are pushed or pressed by passing the copper wires 162 together through a heated die 706. The die 706 forces the fluoropolymer coating applied to the surface of the oxidized copper-graphite multilayer composite 166 coated copper wires 162 to flow around the oxidized surfaces 168 of the copper wires 162 and form a fluoropolymer matrix 170, bonding the copper wires 162 together. In embodiments, the bundle 174 may be a coherent bundle where the copper wires 162 lie in the same relative position at the beginning and end of the bundle 174. In embodiments, the die 706 is heated to a consolidation temperature that is in the range of 375 degrees C. to 400 degrees C., including all values and ranges therein. The consolidation temperature is understood as a temperature that allows for deformation and flowing of the fluoropolymer and, in embodiments, is high enough to anneal the copper wires 162. Further, the fluoropolymer coated outer surface oxidized copper-graphite multilayer composite 166 coated copper wires 162 has a residence time in the die of 0.2 milliseconds to 1 millisecond, including all values and ranges therein to allow for flow and consolidation of the fluoropolymer into the fluoropolymer matrix 170. In embodiments, the die length may be in the range of 10 millimeters to 100 millimeters including all values and ranges therein and the speed at which the wire is drawn through the die may be in the range of 1 millimeter per second to 100 meters per second, including all values and ranges therein. In addition, as alluded to, the residence time and consolidation temperature recrystallize and anneal the copper wires 162. Annealing of the copper in the copper wires 162 may assist in reducing wire brittleness and increases wire electrical conductivity.

At block 608 the bundle 174 is then coated with a jacket 172, which provides electrical insulation for the bundle 174. The jacket 172 includes a polymer. The polymer includes, in embodiments, polyetherimide (PEI), polyether ether ketone (PEEK), polyimide (PI), polyamide imide (PAI), or an epoxy formed from the polymerization of an epoxide. The jacket 172 is applied using one of a number of processes including drawing the bundle 174 through one or more dies 708, such as an extrusion die, and the polymer is extruded over the bundle 174. The die 708 may be formed to accommodate any convex or concave curves in the bundle 174. In embodiments, multiple layers of the jacket 172 may be applied. The resulting wire bundle is a composite wire bundle 160 including a plurality of copper wires, wherein each of the plurality of copper wires include a surface, a copper-graphene multilayer composite formed on the copper wire surface, wherein the exterior of the copper graphene-multilayer composite is oxidized, a fluoropolymer coating formed on the copper-graphene multilayer composite, the fluoropolymer coating forming a matrix around the copper wires, and a jacket encapsulating the plurality of copper wires and fluoropolymer coating.

In embodiments, the composite wire bundles 160 are then used to form the windings 148 of the stator 142. The composite wire bundles 160 are wound around the teeth 154 of the stator 142 and inserted into the channels 156. The windings 148 may then be affixed to the busbars 150 and connected to other components in the propulsion system, such as the inverter 128.

The composite winding bundles for use in a stator, stators including composite winding bundles for use in a vehicle, and methods of forming composite stator winding bundles for use in vehicle, described herein offer a number of advantages. These advantages include an increase in wire insulation between the individual copper wires due to the oxidation of the external copper-graphite layer of the copper-graphite multilayer coating as well as the inclusion of the fluoropolymer matrix between the wires. In addition, insulation is provided by the bundle jacket. The advantages also include leveraging the skin effect to increase electrical conductivity by providing multiple smaller wires, rather than a single wire of the same cross-sectional area, creating a larger skin area. Further, the area of the cooper-graphene multilayer composite in increase, also increasing electrical conductivity. These advantages further include improved magnetic field generation, which may increase torque generated and efficiency of the motor. These advantages yet further include providing electrical insulation for the wire bundle. In addition, these advantages include improvements in high frequency applications such as in the range of 1 kilohertz to several tens of kilohertz, where the skin effect is increased, such as high-speed motors. These advantages also include reduced energy loss.

As used herein, the term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component (s) in the form of memory and storage devices (read only, programmable read only, random access, hard drive, etc.). The controller 132 may also consist of multiple controllers which are in electrical communication with each other. The controller 132 may be inter-connected with additional systems and/or controllers of the vehicle 100, allowing the controller 132 to access data such as, for example, speed, acceleration, braking, and steering angle of the vehicle 100.

A processor may be a custom made or commercially available processor, a central processing unit (CPU), a graphics processing unit (GPU), an auxiliary processor among several processors associated with the controller 132, a semiconductor-based microprocessor (in the form of a microchip or chip set), a macro processor, a combination thereof, or generally a device for executing instructions.

The tangible, non-transitory memory 134 may include volatile and nonvolatile storage in read-only memory (ROM), random-access memory (RAM), and keep-alive memory (KAM), for example. KAM is a persistent or non-volatile memory that may be used to store various operating variables while the processor is powered down. The tangible, non-transitory memory 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 132 to control various systems of the vehicle 100.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A composite wire bundle for a stator winding, comprising:
 a plurality of copper wires, wherein each of the plurality of copper wires include a first surface;
 a copper-graphene multilayer composite applied to the first surface of each of the plurality of copper wires, wherein the copper-graphene multilayer composite includes a second surface and copper included in the copper-graphene multilayer composite is oxidized at the second surfaces;
 a fluoropolymer matrix formed around the second surfaces; and
 a jacket encapsulating the fluoropolymer matrix.

2. The composite wire bundle of claim 1, wherein each of the plurality of copper wires exhibit a diameter in the range of 0.3 millimeters to 10 millimeters.

3. The composite wire bundle of claim 1, wherein the oxidized copper in the second surface exhibits a thickness in the range of 5 micrometers to 15 micrometers.

4. The composite wire bundle of claim 1, wherein the copper-graphene multilayer composite exhibits an electrical conductivity in the range of 105% to 400% of the International Annealed Copper Standard (IACS).

5. The composite wire bundle of claim 1, wherein the copper-graphene multilayer composite exhibits a thickness in the range of 10 nanometers to 500 micrometers.

6. The composite wire bundle of claim 1, wherein the copper-graphene multilayer composite includes a plurality of alternating layers of graphene and copper.

7. The composite wire bundle of claim 1, wherein the copper-graphene multilayer composite includes particles of graphene dispersed between a plurality of coated copper layers.

8. The composite wire bundle of claim 1, wherein the fluoropolymer matrix includes polytetrafluoroethylene.

9. The composite wire bundle of claim 1, wherein the jacket includes a polymer.

10. The composite wire bundle of claim 9, wherein the polymer includes at least one of the following polymers: polyetherimide (PEI), polyether ether ketone (PEEK), polyimide (PI), polyamide imide (PAI), and an epoxy.

11. The composite wire bundle of claim 9, wherein the jacket includes multiple polymer layers.

12. The composite wire bundle of claim 1, wherein the fluoropolymer matrix includes polytetrafluoroethylene, and the jacket includes a polymer.

13. The composite wire bundle of claim 1, wherein the composite wire bundle is wrapped around a plurality of teeth and held in a plurality of channels defined between the plurality of teeth in a stator core.

14. The composite wire bundle of claim 13, wherein the composite wire bundle is connected to a busbar.

15. The composite wire bundle of claim 14, wherein the busbar is connected to an inverter.

16. A stator including a composite wire bundle for a vehicle, comprising:
 a stator core including a plurality of channels defined by a plurality of teeth; and
 the composite wire bundle received in the plurality of channels, the composite wire bundle including a plurality of copper wires, wherein each of the plurality of copper wires includes a first surface, a copper-graphene multilayer composite applied to the first surface of each of the plurality of copper wires, wherein the copper-graphene multilayer composite includes a second surface, and copper at the second surface is oxidized, a fluoropolymer matrix formed around the oxidized copper surfaces, and a jacket encapsulating the plurality the fluoropolymer matrix.

17. A method of forming composite wire bundles for a stator, comprising:
 oxidizing copper included in a first surface of a copper-graphene multilayer composite formed on each of a plurality of copper wires;
 applying a fluoropolymer on the first surface of the copper-graphene multilayer composite formed on each of the plurality of copper wires, wherein the copper included in the first surface of the copper-graphene multilayer composite is oxidized before applying the fluoropolymer;
 curing the fluoropolymer;
 consolidating the plurality of copper wires;
 forming a fluoropolymer matrix with the applied fluoropolymer, wherein the fluoropolymer matrix surrounds the first surfaces; and
 forming a jacket around the fluoropolymer matrix.

18. The method of claim 17, further comprising annealing the copper wires upon curing the fluoropolymer.

19. The method of claim 17, wherein the fluoropolymer is applied as a fluoropolymer coating on each wire, wherein the fluoropolymer coating exhibits a thickness in the range of 0.1 micrometers to 500 micrometers.

20. The method of claim 17, wherein the plurality of copper wires are consolidated by passing the plurality of copper wires together through a heated die.

* * * * *